United States Patent [19]

Gartner et al.

[11] Patent Number: 5,205,167
[45] Date of Patent: Apr. 27, 1993

[54] METHOD AND APPARATUS FOR LOCATING STRATIFICATION IN PRODUCTION FLUID IN A WELL

[75] Inventors: Michael L. Gartner, Austin; Larry L. Gadeken, Houston, both of Tex.

[73] Assignee: Halliburton Logging Services, Inc., Houston, Tex.

[21] Appl. No.: 841,948

[22] Filed: Feb. 26, 1992

[51] Int. Cl.[5] .................. E21B 47/00; G01V 5/12
[52] U.S. Cl. ............................... 73/155; 73/19.1; 250/269; 250/267
[58] Field of Search ............ 73/861.04, 19.1–19.09, 73/155; 250/253, 256, 267, 269

[56] References Cited

U.S. PATENT DOCUMENTS

| | | | |
|---|---|---|---|
| 3,258,963 | 7/1966 | Bryant et al. | 73/861.04 |
| 3,909,603 | 9/1975 | Nicolas | 324/324 X |
| 4,441,361 | 4/1984 | Carlson et al. | 73/155 |
| 4,939,362 | 7/1990 | Supernaw et al. | 250/267 X |

Primary Examiner—Hezron E. Williams
Assistant Examiner—Michael Brock
Attorney, Agent, or Firm—William J. Beard

[57] ABSTRACT

Apparatus for measuring the volume of gas present in a multiphase flow regime in a cased oil or gas well borehole and the amount, if any, of stratification thereof at a particular borehole depth. The apparatus includes a low energy gamma ray source and a sodium iodide detector located a very short distance from the source and separated by shielding material. Low energy gamma rays, unable to leave the well casing and return, are emitted from the source and scattered back from the multiphase production fluid to a detector comprising a sodium iodide crystal and photomultiplier tube. Both the source and detector are surrounded by rotatable slit collimators to provide sensitivity to azimuthal variations in gas volume percentage in the flow.

18 Claims, 3 Drawing Sheets

METHOD AND APPARATUS FOR LOCATING STRATIFICATION IN PRODUCTION FLUID IN A WELL

BACKGROUND OF THE DISCLOSURE

This invention deals with the measurement of gas holdup in multiphase fluid flow in a cased well borehole. More particularly, this invention deals with an apparatus for measuring the volume of gas present in a multiphase flow regime in a cased oil or gas well borehole and the amount, if any, of stratification thereof at a particular borehole depth.

The problem long existing in the area of production logging of cased well boreholes has been to separate the phases of flow, namely solid, liquid or gaseous, and measure each component of the multiphase flow. Addition of the phases of solid, liquid, and gas in a multiphase flow provides the totals. The liquid phase may also contain slugs of oil or water interspersed with the solid particles and the gaseous phase may be in the form of small bubbles or large bubbles. So called stratified flow may occur at locations where the casing may be horizontal or nearly horizontal or where the gas phase has separated by gravity from the liquid and solid phase and formed a stratified gaseous layer. Locating such stratified areas of a well is highly desirable.

Of course, the measurement of the liquid phase, solid phase, and gaseous phase of the well fluid may be divided into separate measurements of each of the phases. The present invention concerns instruments and techniques for measuring the gaseous phase of fluid flow in a cased well borehole in which the gaseous phase is separated out from the liquid phase i.e., not in solution with the liquid phase, in the form of small or large gas bubbles or in locating stratified fluid flow in the well. The techniques and apparatus of the present invention are not believed to be applicable in the situation where the gas produced by the well is in solution with the liquid phase. However, as will be discussed in more detail subsequently, the present apparatus and techniques do encompass methods for the measurement of gas holdup or percentage volume gas flow in bubble form or locating zones of the stratified form of flow in the cased well borehole.

BRIEF DESCRIPTION OF THE INVENTION

The apparatus and techniques of the present invention comprise the use of a low energy gamma ray source and a sodium iodide detector located a very short distance from the source and separated from it by shielding material. Low energy gamma rays are emitted from the source and scattered back from the production fluid to a detector comprising a sodium iodide crystal and photomultiplier tube. Both the source and detector are surrounded by rotatable slit collimators to provide sensitivity to azimuthal variations in gas volume percentage in the flow. The count rate is recorded as a function of azimuthal angle and is inversely proportional to the gas volume fraction in the azimuthal region of the cased borehole probed by the collimated source and sensed by the collimated detector. The count rate may also be summed over all azimuthal locations to provide a measure of total gas volume within the production fluid.

The use of relatively low energy gamma rays renders the instrument and technique insensitive to changes in formation character outside the well casing. The casing effectively acts as a screen or shield for the low energy gamma rays, preventing the gamma rays from reentering the production fluid through the casing and reaching the detector after first passing through the casing into the formation. Thus the instrument is unable to detect gamma rays that have interacted with the formation material and is therefore insensitive to changes in formation properties.

Also, by judicious choice of the distance between the source and detector and because of the relatively low energy of the gamma ray source, competing Compton scattering and photoelectric absorption effects are made to effectively cancel, rendering the instrument and techniques relatively insensitive to the composition of the liquid in the borehole, i.e., oil, salt water, fresh water. This cancellation occurs because for the liquids commonly present in a production fluid, i.e., oil, fresh water, salt water, an increase in density due to a change of the liquid phase from oil to fresh water or salt water, resulting in an increase in Compton scattering and a corresponding increase in count rate, is accompanied by an increase in the average atomic number Z, resulting in an increase in photoelectric absorption and a corresponding decrease in count rate. The increase in count rate resulting from the increase in density effectively equals the decrease in count rate resulting from the corresponding increase in average atomic number Z, producing no net change of count rate if, for a given gas volume, the liquid phase is changed from oil to fresh water or salt water. Cancellation also occurs if the liquid is changed from salt water to fresh water or oil, resulting in a decrease in density and a corresponding decrease in average atomic number. Thus a measurement is provided of gas holdup or gas volume percentage of the flow which is relatively insensitive to material composition inside or outside the casing. The apparatus is also relatively insensitive to the casing thickness but not to the casing diameter, for which compensation can be provided.

The present invention may be best understood by the following detailed description thereof when taken in conjunction with the accompanying drawings in which:

DESCRIPTION OF THE PREFERRED EMBODIMENT

Well logging surveys are often made in producing oil and gas wells to determine the volumetric concentration of each component. These data along with measurements of the fluid flow velocity may be used to determine production rates from each zone of interest in the well. Thus, intervals producing oil, gas, water, or some combination of the three may be identified in the producing well. Such data are essential for improving oil and gas production, reducing water production, and managing the field reservoir.

The apparatus and techniques of the present invention disclosed methods and techniques of measuring the volume fraction of gas (gas holdup) in the production fluid. The gas holdup is distinguished from the gas cut which is the total volume of gas versus liquid produced at the surface. The gas/liquid ratio varies as a function of pressure in the well borehole. Since the gas is relatively compressible, the gas holdup at deeper depths in a well borehole usually amounts to less volume percentage of the fluid flow at such greater depths than the gas cut which is produced at the surface.

Figure 1:
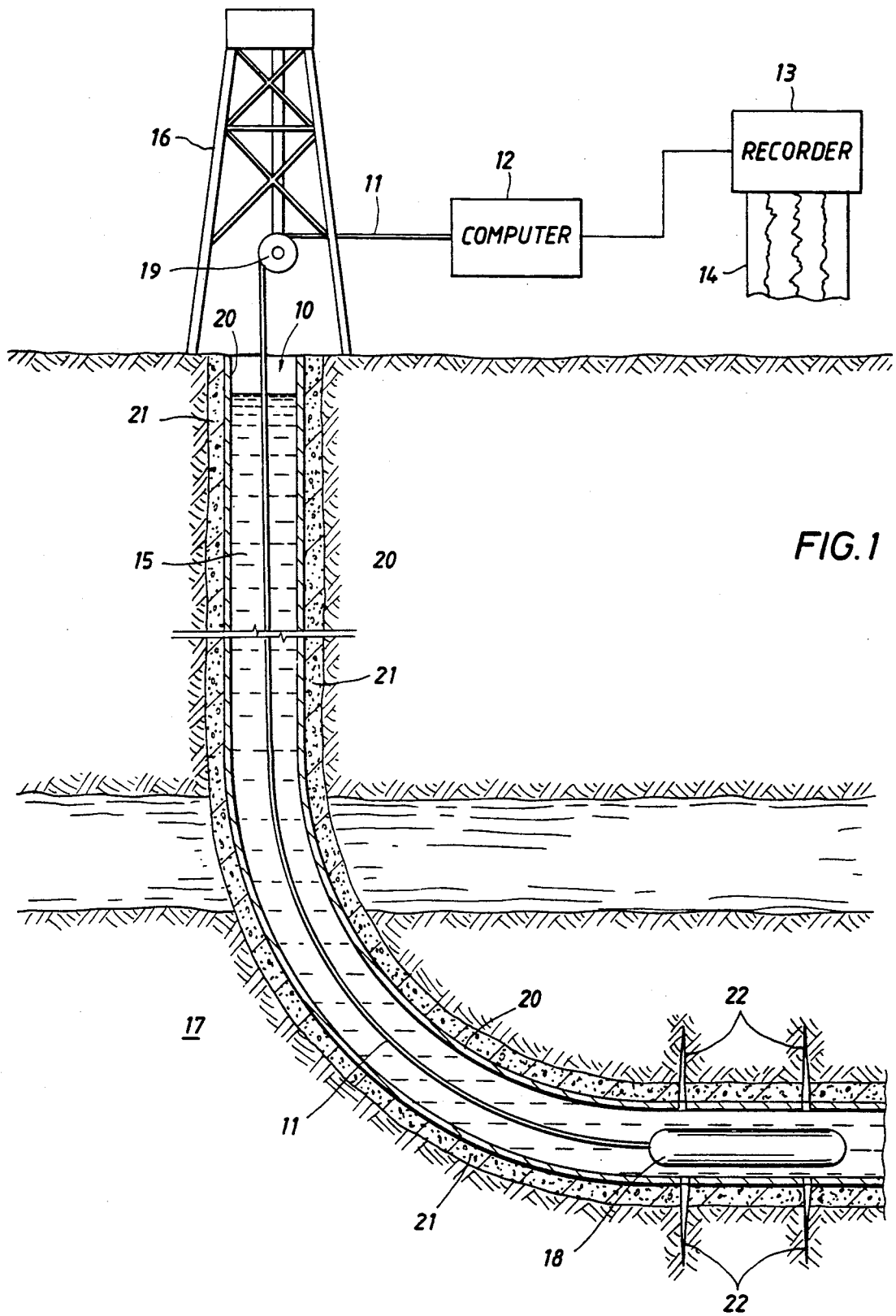
FIG. 1 is a schematic view illustrating an instrument according to concepts of the present invention deployed in a highly deviated well borehole.

Referring initially to FIG. 1, a well logging sonde is deployed in a cased well borehole 10 via a well logging cable 11 of the conventional armored multiconductor type known in the art. The well is a highly deviated well. A rig structure 16 at the surface supports a sheave 19 over which the logging cable 11 passes in a conventional manner. Reel equipment (not shown) is located at the surface to raise and lower this well logging sonde 18 in the cased borehole 10. The borehole 10 is cased with a steel casing 20 surrounded by a cement sheath 21 to hold the casing 20 in place and to prevent fluid communication between the numerous multiple horizontal layers of formations 17 penetrated by the well borehole 10. The cement sheath 21 and the casing 20 are penetrated by several perforations 22 into a producing zone so that produced fluids, liquids and gas enter the well borehole from the production perforations. The produced fluids may contain gas which is indicated by the bubbles in the well fluid 15 shown in FIG. 1. It is the purpose of the tool 18 of FIG. 1 to measure the volume percentage of gas or gas holdup according to principles of the present invention and to send signals via the logging cable 11 to a surface computer 12 which determines the gas holdup as a function of depth and azimuthal distribution and supplies the recorder 13 with this information which is output on a record medium 14.

Figure 2:
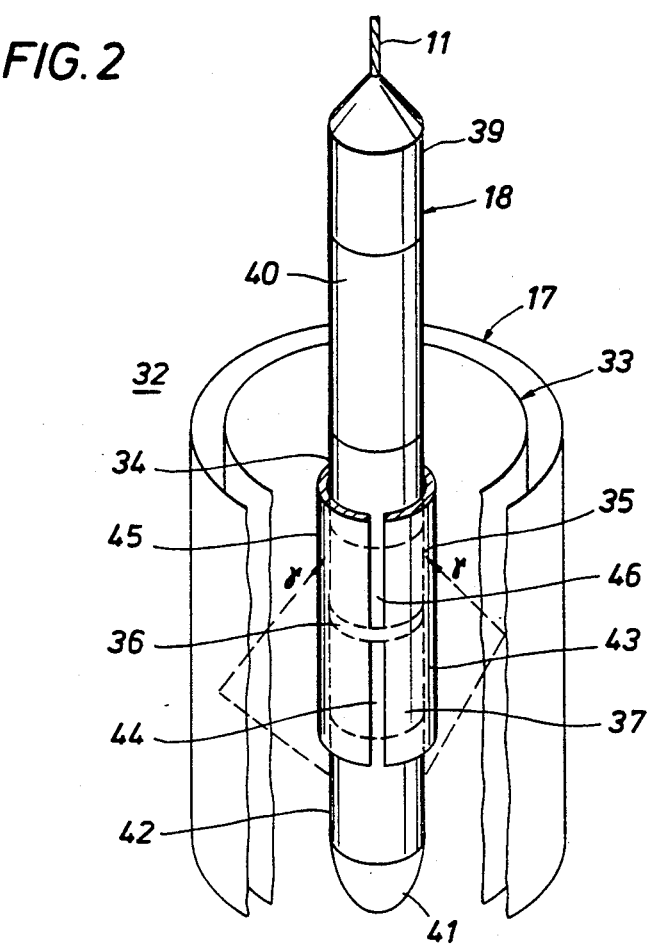
FIG. 2 is a schematic illustration showing the well logging instrument according to the concepts of the present invention deployed in a cased borehole.

Referring now to FIG. 2, a gas holdup tool 18, according to concepts of the present invention, is illustrated schematically but in more detail than shown in FIG. 1. A well logging cable 11 is connected in a conventional manner to the upper end of the logging tool 18. A bull plug 41 protects the lower end of the tool and prevents it from being damaged while being run in or out of the well borehole 20. A radioactive source of relatively low energy gamma rays is disposed at the lower end of the logging tool 18. This source may consist of a radioactive isotopic Cobalt 57 source having a photo peak energy of 122 keV; the source may also consist of an X-ray tube with suitable shielding on the target to produce photons with average energy of about 122 keV. A rotatably mounted slit collimator 43 of tungsten, steel or other material suitably opaque to 122 KEV gammas surrounds the source 37. The collimation slit 44 is moved circumferentially about the source 37 by a motor drive 42. The azimuthal location of the slit 44 is supplied from motor 42 to the electronics section 40 and telemetry section 39 and thus from tool 18 to the surface. Likewise, a rotatably mounted slit collimator 45 of tungsten, steel or other material suitably opaque to the detected gamma rays surrounds the detector crystal 35. The collimation slit 46 is moved in tandem with slit 44 by the motor drive 42 so that 44 and 46 are at all times at the same azimuthal location.

This radioactive source 37 thus primarily supplies 122 KEV gamma rays thru the collimator slit 44 which impinge upon the fluid inside the casing 33 and which rays are indicated by the dotted lines labeled with the Greek letter $\gamma$ in FIG. 2. As previously discussed the energy of the source gamma rays is chosen to cancel the effects of Compton scattering and photoelectric absorption. For a detector located very close to the source and casing diameters up to 8 inches a source energy of from 100 KEV to 150 KEV is suitable to obtain such cancellation. The source 37 is additionally separated by a lead shield 36 from a detector crystal 35 which is situated in close spacing to the gamma ray source 37. The detector crystal 35 is separated by the lead shielding material 36 which is sufficiently thick (approximately one half inch) to prevent direct irradiation of the detector crystal 35 by the gamma rays from the cobalt 57 radioactive source 37.

The scattered gamma rays from the irradiated fluid inside the casing are scattered back toward the detector crystal 35 which typically may comprise a one inch diameter by two inch long sodium iodide crystal which is optically coupled to a one inch diameter photomultiplier tube (PMT) 34. It will be noted that the relatively low energy gamma rays will not penetrate two thicknesses of the surrounding well casing 33. Thus, gamma rays which leave the cased hole are not likely to be scattered back into detector crystal 35 by the earth formations 17 surrounding the well casing 33. The outside housing of the instrument 18 of FIG. 2 comprises a 11/16 inch diameter thin wall steel tubing but may also consist of other metals, such as aluminum, stainless steel, or the like.

Light flashes produced in the detector crystal 35 are detected by photomultiplier tube 34, converted to electrical pulses and amplified and supplied to an electronic section 40 of the down hole instrument 18. The pulses produced by the PMT 34 are counted along each particular azimuthal location of collimator slits 44 and 46 and stored in a memory bank in the electronic section 40 of the instrument. The pulses are transferred out of the memory bank at a regular rate by means of a telemetry system 39 located at the upper end of the sonde. Count rate signals at each azimuthal location of collimator slits 44 and 46 as the slits move circumferentially around the source 37 from the telemetry component are supplied to the surface by a conductor or several conductors within a conventional multiconductor well logging cable 11 armored on the outside in a manner known in the art.

Figure 3:
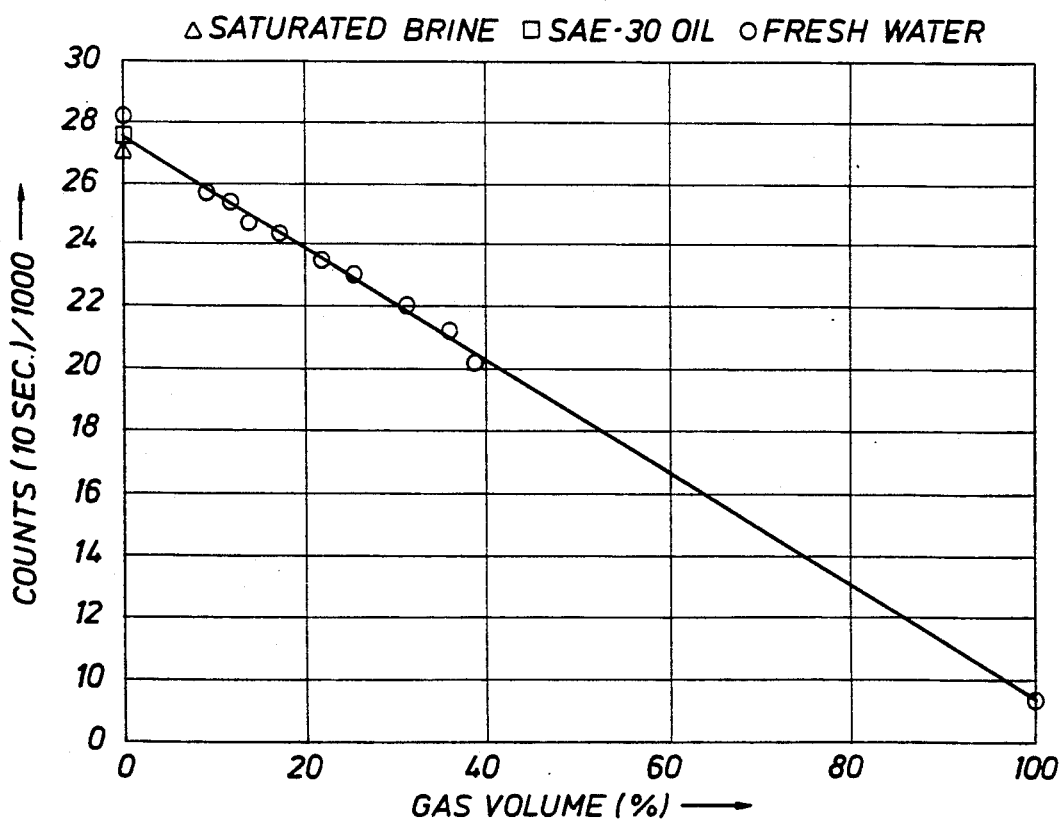
FIG. 3 is a graphical representation illustrating the response of a tool according to concepts of the present invention for different gas hold ups or gas volume distribution and with different liquids.

Signals from the telemetry circuit 39 in the downhole tool 18 are detected at the surface and supplied to the surface computer 12 which is programmed to implement the predetermined relationship shown in FIGS. 3, which is a graphical relationship illustrating the count rate at the detector in the downhole tool as a function of gas volume or gas holdup being produced from the earth formations in the vicinity of the well borehole 10 of FIG. 1.

As shown in FIG. 3, the count rate is inversely proportional to the gas holdup present in the fluid flow at the location of the detector. Thus, the instrument made according to the concepts of the present invention is suitable for use in highly deviated wellbores such as that illustrated in FIG. 1 in which horizontal layering or stratification of the fluids may occur at depths where the wellbore runs essentially in a horizontal direction. In such instances the azimuthal angle of the collimators in the direction of the layering or stratification will indicate a much larger gas holdup than in azimuthal directions where there is only liquid around the tool.

Figure 4:
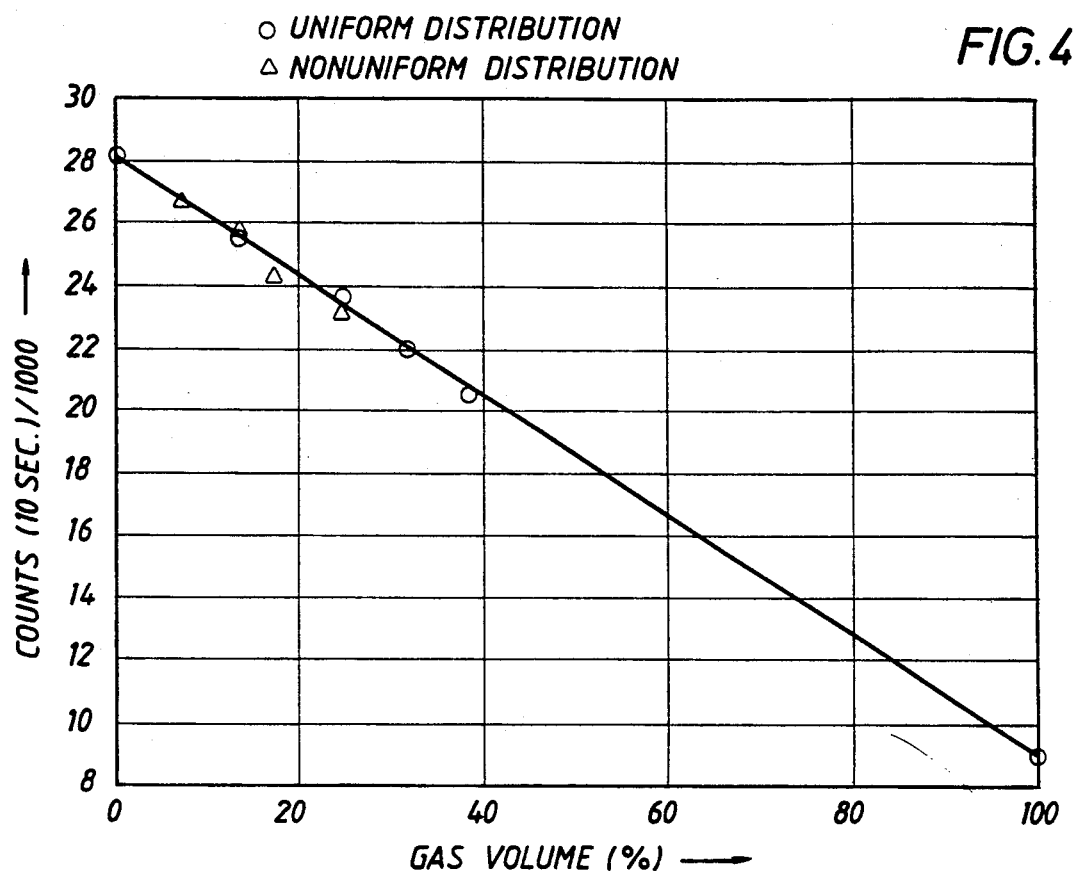
FIG. 4 is a graphical representation illustrating the response of the uncollimated instrument or the sum of measurements over all azimuthal angles according to the concepts of the present invention with uniform and nonuniform (stratified) gas distributions surrounding the instrument.

In FIG. 4 a graphical representation illustrating the count rate at the detector as a function of the gas holdup for both fresh water and salt water fluids in the fluid filled borehole is illustrated. This graph shows that the response remains the same and approximately linear whether the produced fluid is fresh water or salt water. Similar responses from oil, light oil and heavy oil (not shown) illustrate that the instrument response is maintained in a linear fashion in all cases in which the gas is not in a dissolved state in the fluid produced by the well. Laboratory calibration measurements produced with known standards on apparatus have determined the graphical relationships in FIGS. 3 and 4. Similar laboratory measurements have shown that the system is not sensitive to casing thickness in any great measure and that while the measurement is sensitive to the diameter of the well casing, calibration relationships for a casing of a particular diameter enables a system to be sized and scaled before hand in the memory of surface computer 12 so that diameter change can be easily corrected.

Figure 5:
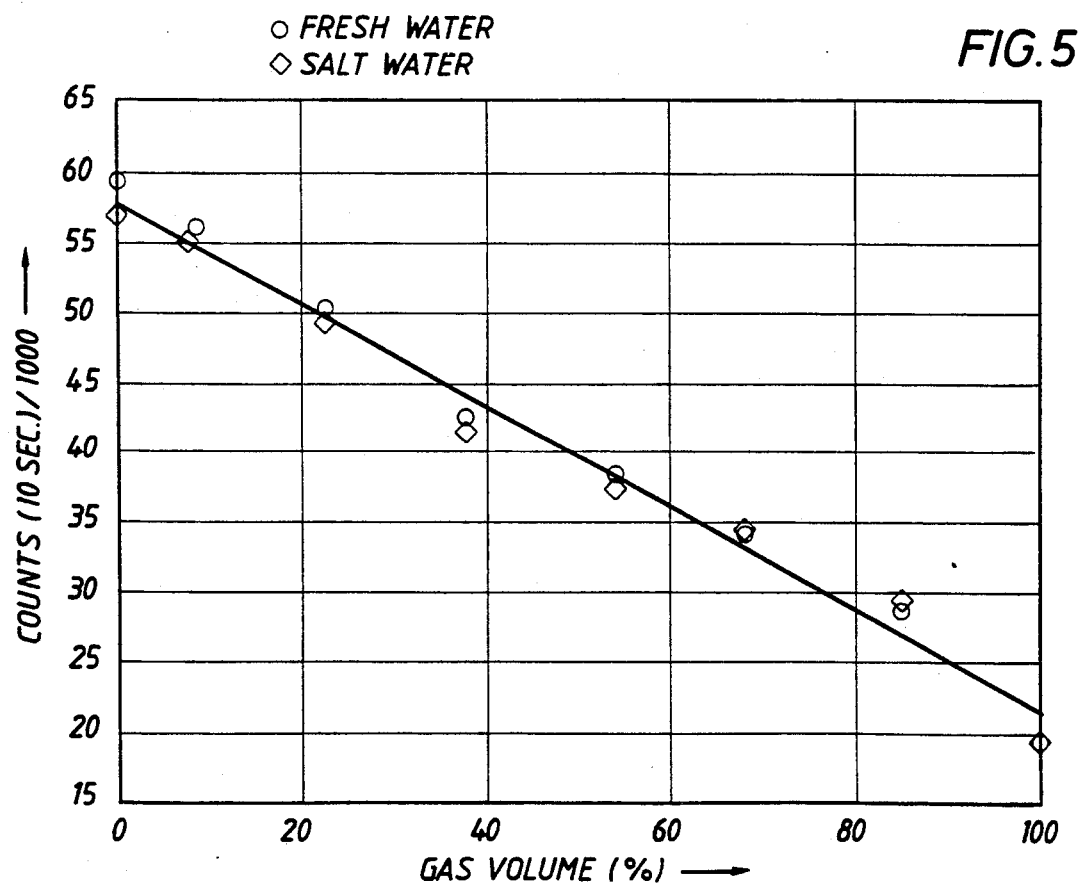
FIG. 5 is a graphical representation illustrating the relative insensitivity of the instrumentation and methods of the present invention to water salinity.

Experiments with apparatus such as that illustrated in FIG. 2 have indicated that the measurement of the gas holdup made with such an instrument can be a precise measurement and is relatively insensitive to the composition of the liquid phase whether oil, salt water, or fresh water, insensitive to material changes outside the casing due to the shielding effect of the casing and insensitive to casing thickness (but not casing diameter). Also, if uncollimated source and detector are used, the tool 18 is relatively insensitive to the volume distribution of the gas holdup in the well fluid. This is shown in FIG. 5 in which a graphical relationship of the count rate is illustrated for both nonuniform and uniform gas volume distributions in the vicinity of the detector. The last attribute implies that the measurement made with azimuthally collimated source and detector in highly deviated wells where the gas may be separated from the liquid phase to determine if stratification of fluids has occurred may be summed overall azimuthal directions to provide an accurate measure of total gas volume fraction in the production fluid.

The record produced by the recorder 13 of FIG. 2 is a curve of gas holdup as a function of depth in the well borehole of the downhole sonde 18 and, at each depth, as a function of collimator azimuthal angle. This information can be interpreted dependent on entry points of gas or separation of gas and liquid phases at changing pressure conditions at different depth levels in the well borehole and provides a very valuable cross section of the well production for analysis by the geophysicists.

While the foregoing description may suggest other or alternative embodiments of the invention to those skilled in the art, it is the aim of the appended claims to encompass such changes and modifications within the true spirit and scope of the invention.

What is claimed is:

1. A system for determining the existence of stratified flow in the gas phase of well fluids produced in a cased well borehole and flowing upwardly through a metal casing comprising:
   (a) a source of relatively low energy gamma rays, the energy of said gamma rays being chosen such that there is a small probability that a gamma ray from said source could penetrate a metal casing in the borehole and be scattered back through the metal casing by material outside the casing;
   (b) means for collimating gamma rays from said source of low energy gamma rays selectively along an azimuthal direction with respect to the axis of the well casing and for generating a signal indicative of said azimuthal direction;
   (c) a scintillation detector of gamma radiation and cooperative shielding means for preventing direct irradiation of said detector by said source while allowing the placement of said detector in as close proximity to said source as allowed by said cooperative shielding means to allow detection of gamma rays emitted by said source and scattered by materials inside said metal casing;
   (d) means for counting gamma rays detected by said detector and storing count rate signals indicative thereof;
   (e) means for processing said count rate signals according to a predetermined relationship to derive a measurement signal indicative of the gas holdup phase of well fluid in the vicinity of said source; and
   (f) means for displaying said gas holdup signal as a function of said azimuthal signal to provide an indication of stratified fluid flow.

2. The apparatus of claim 1 further including a housing means for housing said source and detector internally of said metal casing in which well production fluid is flowing.

3. The apparatus of claim 2 wherein said housing means internally supports said source, said detector, and said gamma ray counting means and said housing is moveable through the cased wellbore supported on a wireline cable.

4. The apparatus of claim 3 wherein said shielding means comprises at least approximately one half inch thickness of lead having the same cross sectional shape and area as said scintillation detector and said shielding is placed immediately adjacent said scintillation detector at one end of a cylindrically shaped sodium iodide crystal comprising a portion of said detector and said crystal has a second end having a photomultiplier tube optically coupled thereto to form pulse count signals.

5. The apparatus of claim 3 further including a telemetry system in said housing means for transmitting said count rate signals and said azimuthal indicative signals on said wireline cable as telemetry signals from said housing means to the earth's surface.

6. The apparatus of claim 5 further including computer means for processing said telemetry signals received at the surface of the earth according to a predetermined relationship as a function of well casing diameter to derive a measurement signal indicative of gas holdup, and including means for displaying said signal as a function of borehole depth.

7. The system of claim 6 wherein said predetermined relationship which is a function of well casing diameter comprises one of a plurality of calibrated relationships from plural and various diameter well casings stored in the memory of said computer means.

8. The apparatus of claim 1 wherein said gamma ray source comprises radioactive Cobalt 57 isotope source for supplying gamma rays having a 122 KEV photopeak energy.

9. The apparatus of claim 8 wherein said source and detector are housed in a closed housing member positioned inside the wall casing in which produced well fluids are flowing to the earth's surface.

10. The apparatus of claim 9 wherein said detector means comprises an approximately cylindrical sodium iodide crystal optically coupled to a photomultiplier tube.

11. A system for measuring the gas holdup of well fluids produced in a metal cased well borehole, the system comprising:
(a) a sealed logging tool housing or sonde sized and adopted to pass through a cased well borehole;
(b) a source in said housing of relatively low energy gamma rays having an energy selected so that there is a very small probability that a gamma ray from said source will penetrate the casing in the well borehole and be scattered back through the casing by formation material outside the casing;
(c) a closely spaced detector in said housing responsive to gamma radiation;
(d) cooperative shielding means interposed between said source and said detector, said shielding means determining the proximity of spacing between said source and said detector;
(e) means for counting gamma rays detected by said detector and storing count rate signals indicative thereof;
(f) means for processing said count rate signals according to a predetermined relationship to derive a measurement signal indicative of a gas holdup phase of well fluids in the vicinity of said housing; and
(g) means for recording said gas holdup phase measurement signal as a function of well borehole depth.

12. The system of claim 11 wherein said cooperative shielding means comprises approximately one half inch thickness of lead having a cross sectional shape and area as said detector.

13. The system of claim 12 wherein said detector comprises a thallium activated sodium iodide crystal optically coupled to a photomultiplier tube.

14. The system of claim 11 wherein said detector comprises a thallium activated sodium iodide crystal optically coupled to a photomultiplier tube.

15. The system of claim 14 further including a telemetry system in said housing for transmitting said count rate signals on a wireline cable along the well borehole.

16. The system of claim 15 further including computer means for processing said telemetry signals according to a predetermined relationship as a function of casing diameter to derive a measurement signal indicative of gas holdup.

17. The system of claim 16 wherein said source comprises a radioactive cobalt 57 isotope source for supplying gamma rays having a 122 keV photopeak energy.

18. The system of claim 11 wherein said source comprises a radioactive cobalt 57 isotope source for supplying gamma rays having a 122 keV photopeak energy.

* * * * *